THEODORE W. ENGELBRECHT
ANDREW C. MARSHALL
WILLIAM L. EMERSON
INVENTORS.

BY
Townsend and Townsend

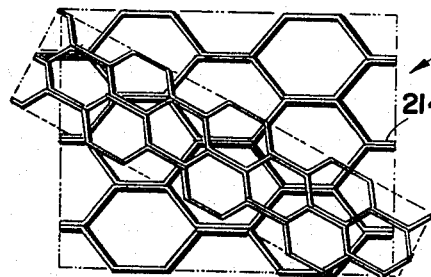
Fig. 7.
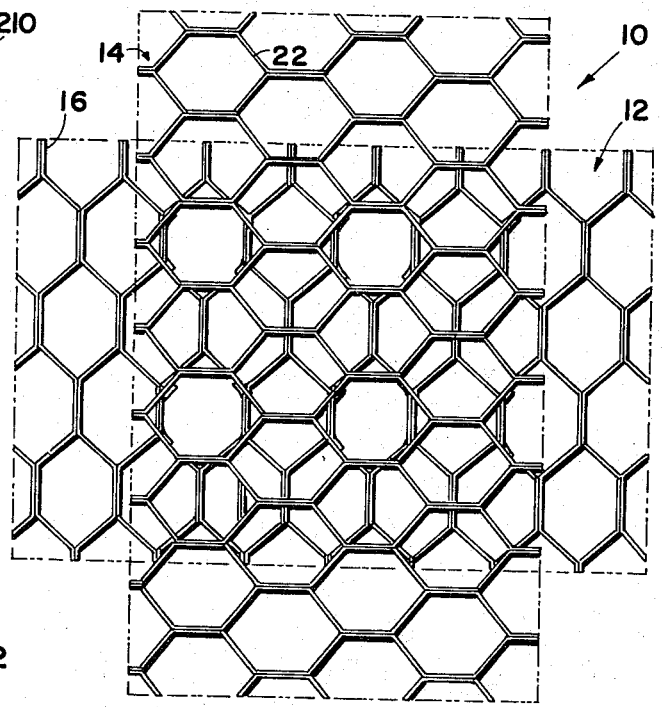
Fig. 6.
Fig. 8.
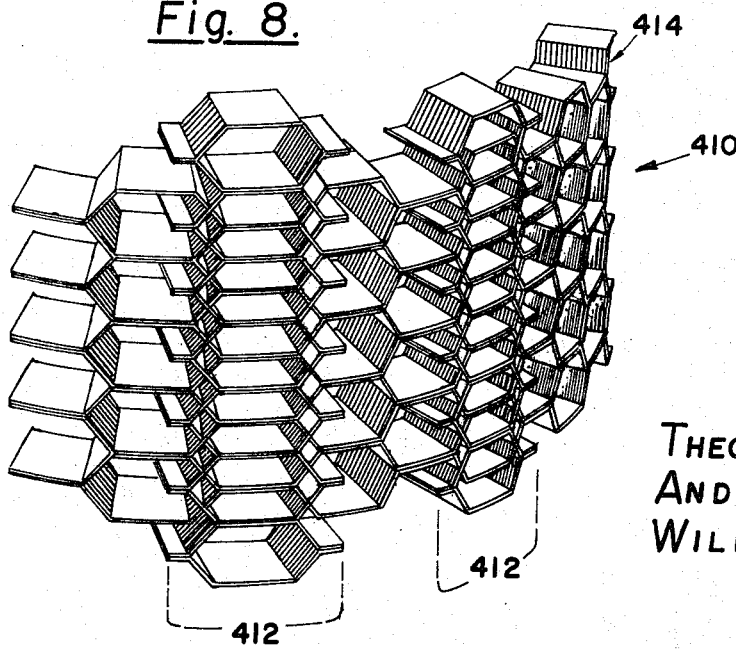
Fig. 9.

United States Patent Office 3,533,894
Patented Oct. 13, 1970

3,533,894
DIRECTIONALLY STABILIZED
HONEYCOMB PRODUCT
Theodore W. Engelbrecht, Concord, Andrew C. Marshall, Lafayette, and William L. Emerson, Danville, Calif., assignors to Hexcel Corporation, Berkeley, Calif., a corporation of California
Filed Oct. 24, 1965, Ser. No. 504,306
Int. Cl. B32b 3/12; E04b 2/28
U.S. Cl. 161—68        6 Claims

ABSTRACT OF THE DISCLOSURE

A structural panel comprising a pair of expanded honeycomb members embedded in each other to form a composite structure and with the honeycomb ribbons of one panel disposed perpendicular to the ribbons of the second panel so as to provide a composite panel having substantially isotropic structural properties.

---

This invention relates to a honeycomb construction and, more particularly, to a honeycomb product having improved strength characteristics.

The present invention resides in an improved honeycomb product and the method of maknig the same wherein the product is comprised of a pair of expanded honeycomb members with one member being embedded in the other member to form a composite structure. As a result of this interconnection of the members, the resulting product has increased structural strength properties over that of either of the honeycomb members taken individually. The product therefore has a wider range of applications than the individual members. The increased strength of the product results from the specific orientation of the undulating ribbons of the two members, the ribbons of one of the members extending transversely of the ribbons of the other members. Shear strength of the resulting product in the W direction has been found to be equivalent to that in the L direction so that the product is substantially isotropic with respect to this parameter. The product is also able to withstand greater compressive or tensile loads than its members taken individually and its stiffness with respect to column loading is greater than that of the individual members.

As used herein and as used and understood in the art, the "L direction" of a honeycomb panel is the direction in which the webs or ribbons making up the honeycomb extend, the "W direction" is the direction perpendicular to the ribbon or W direction. As is well known, honeycomb materials do not have the same structural strength properties in both the L and W directions. For instance, the shear strength parameter of a sheet of honeycomb in the W direction is generally in the range of 45% to 65% of that in the L direction. The orientation of the sheet, when in use, thus becomes important, especially where external loads are randomly applied thereto.

The versatility of honeycomb for use as a structural unit will be enhanced if it is isotropic with respect to its strength characteristics. Hence, it is advantageous to increase the structural strength properties of a honeycomb product, especially in the W direction thereof, so that it will approximate its structural strength properties in the L direction. Thus, the product may be used in special applications without regard to its orientation as to external forces applied thereto in the aforesaid directions.

The product of this invention, strengthened in its W direction to an extent such that it will be isotropic in both the L and W directions, may be utilized in special applications such as those mentioned above. Moreover, by following the teachings of the method of this invention, a honeycomb product can be made which has greater structural strength properties at certain localized areas thereof as distinguished from a structural strength increase throughout its entire extent. Such construction permits concentrated loads to be applied to the product at these localized areas without structural damage.

Another important feature of a product made pursuant to the teachings of the invention is the increased surface area which is provided at its opposed faces. As a result, the product may be more effectively bonded to face sheets or other structure.

The instant method includes the forcing or compressing of the aforesaid pair of expanded honeycomb sections or members together so that one of the members, i.e., the member to be strengthened, has embedded therein the other member, namely the strengthening member. The strength increase is due to the disposition of the ribbons of the two members, the ribbons of the one member being disposed transversely of the ribbons of the other member. Conventional presses can be used to perform the method so that the overall cost of the resulting honeycomb product is kept to a minimum.

It is thus the primary object of this invention to provide an improved honeycomb product and a method for making the same wherein the product is strengthened in the W direction thereof so that it may be used as a structural unit in applications where increased structural strength of the product in the W direction is required or desired.

An important aim of the invention is to provide a honeycomb product which is isotropic with respect to its structural strength properties in its L and W directions, so that it may be effectively utilized in an environment requiring such characteristics.

Another object of the present invention is the provision of an improved honeycomb product of the aforesaid character which is formed by embedding a first, expanded honeycomb member in a second expanded honeycomb member with the ribbons of the members being disposed transversely of each other, whereby to substantially equalize the strength properties of the first member in its L and W directions. As a corollary to the formation of the aforesaid product, significant savings in production costs may be realized inasmuch as scrap honeycomb material, which would otherwise be discarded, may be employed as the first honeycomb member mentioned above.

Yet, a further object of this invention is the provision of a honeycomb product whose compressive and tensile strengths as well as its shear strength in its W direction are increased to provide a structural unit having an increased range of applications.

Still a further object of the present invention is the provision of a method for forming a honeycomb product wherein, by the practice of the method, the resulting product can be made not only to have improved strength characteristics throughout its entire extent, but also can be made so as to be strengthened only at certain localized areas thereof.

Other objects of the invention will be made manifest as the following specification progresses reference being had to the accompanying drawings wherein:

FIG. 6 is a fragmentary, plan view of the honeycomb members of FIGS. 1–3.

FIG. 7 is a schematic view of a pair of honeycomb members disposed at an acute angle with respect to each other and being of different cell sizes.

FIG. 8 is a view similar to FIG. 6 but with the members oriented at right angles to each other; and FIG. 9 is a perspective view of a curved honeycomb member having strengthening honeycomb members embedded therein.

Figure 3:
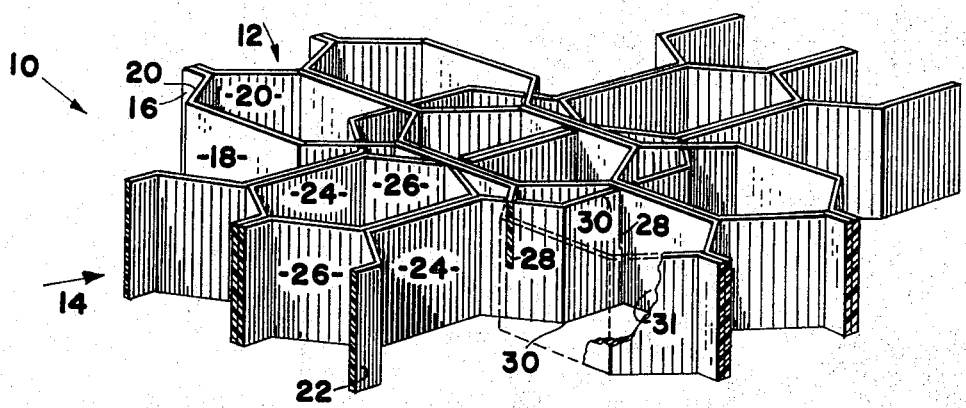
FIG. 3 is a view similar to FIGS. 1 and 2 and showing the resulting honeycomb product when one member is completely embedded in the other member.

One embodiment of the honeycomb product of this invention is denoted by the numeral 10 and is illustrated in FIG. 3. Product 10 includes a pair of expanded honeycomb members 12 and 14 with one of the members, the strengthening member, being embedded in the other member, the member to be strengthened. For purposes of illustration only, member 14 represents the honeycomb structure to be strengthened, although reference hereinafter will be made at various times to product 10 as if it were a new structural element altogether eventhough it is comprised of member 14 which is strengthened by member 12 coupled therewith in a specific manner. In the alternative, member 12 could be the member to be strengthened if desired.

Again, for purposes of illustrating the teachings of this invention, members 12 and 14 are substantially identical in construction and dimensions, each member being formed from a plurality of undulating ribbons which extend in the so-called L direction of the member and are disposed transversely of the so-called W direction thereof. The manner in which members 12 and 14 are formed is of no consequence to this disclosure, it being sufficient to state that such components are in their expanded conditions with their ribbons defining their generally hexagonal cells.

Member 12 includes a plurality of ribbons 16 interconnected to provide a unitary construction. Each ribbon 16 has spaced nodal portions 18 which are bonded in any suitable manner to corresponding nodal portions of the pair of ribbons 16 on opposed sides thereof. Each ribbon 16 has a number of spaced inclined portions 20 which interconnect adjacent pairs of nodal portions 18.

Similarly, member 14 is provided with a plurality of ribbons 22 each having nodal portions 24 interconnected by inclined portions 26 in the manner described above. It is clear that portions 18 and 20 form the cell walls of member 12 and portions 24 and 26 likewise form the cell walls of member 14. Moreover, nodal portions 18 and 24 generally extend in the L direction of members 12 and 14 respectively.

Figure 1:
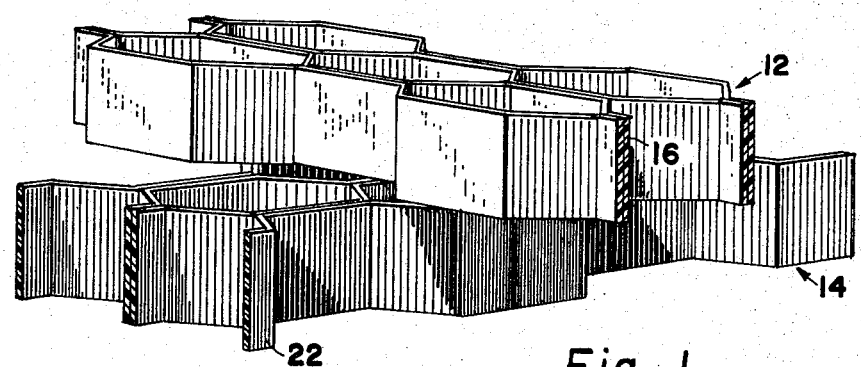
FIG. 1 is a fragmentary, perspective view of a pair of separate, expanded honeycomb members used to form the honeycomb product of this invention.
Figure 2:
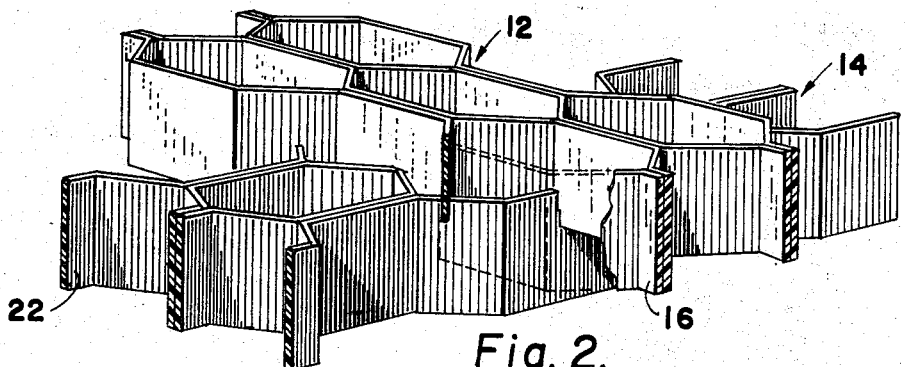
FIG. 2 is a view similar to FIG. 1 and illustrating one of the members partially embedded in the other member.

Although the process of embedding member 12 in member 14 can be accomplished in at least several ways, a preferred form of this process or method includes steps illustrated with reference to members 12 and 14 in FIGS. 1–3. To carry out the method, members 12 and 14 are initially disposed in face-to-face relationship (FIG. 1) with ribbons 16 disposed transversely with respect to ribbons 22. Although FIG. 1 illustrates member 12 above member 14, it is understood that such orientation is not necessary. For instance, members 12 and 14 could be face-to-face or in other relative positions if desired prior to the embedding operation.

In order for member 12 to become embedded in member 14, each ribbons 22 must be transversely slotted at various locations along its length to receive the adjacent ribbons 16 of member 12. Similarly, ribbons 16 must be transversely slotted at the same locations to accommodate the ribbons 22 adjacent thereto. Thus, the slots of ribbons 16 and 22 need extend only one half the width thereof, so that the ribbons will interlock much in the same manner as the compartment-forming panels of an egg crate. While such slots can be formed in ribbons 16 and 24 before member 12 and 14 are forced together, it is preferred that these ribbons be severed simultaneously and to the proper depth as the members are being forced together. This will require that the ribbons be formed from a material capable of being severed during this step. A number of well-known honeycomb materials, such as reinforced plastic, is suitable for this purpose.

To illustrate this severing action, a slot 28 (FIG. 3) in one ribbon 22 extends inwardly from an end edge of this ribbon to approximately the midpoint thereof. Slot 28 is formed when edge 31 of the corresponding ribbons 16 is urged against edge 30 and then inwardly thereof by a force greater than the resistance offered by the corresponding ribbon 22. Similarly, a slot 32 in the last mentioned ribbon 16 is formed by the corresponding ribbon 22, slots 28 and 32 being substantially in alignment with each other and generally formed simultaneously during the embedding process. In the foregoing manner, ribbons 16 and 22 are all partially severed during the embedding step to thereby preclude slotting of the ribbons beforehand. While the extent of severing of the ribbon may vary with the type of material used, the foregoing description with reference to FIG. 3 is sufficient to illustrate the method as well as the structural product resulting from the performance thereof.

Any type of force-applying equipment can be employed to effect the embedding of member 12 in member 14. Preferably, the applied force is of such a nature that pressure is uniformly exerted over the outer faces of the members to guard against any substantial mutilation or structural damage. The force is applied until the proximal face of members 12 and 14 are at least flush with each other. This will assure that no part of member 12 projects outwardly from member 14. Also, the fact that such proximal faces are flush with each other provides an additional advantageous feature for product 10, namely the increased surface area provided therefor at least at one face thereof, to thereby enhance its bonding capabilities if it is later to be used, for instance, as the core of a sandwich structure.

To obtain optimum strength for member 14, member 12 is preferably oriented so that its L direction is substantially perpendicular to the L direction of member 14 as shown in FIGS. 8 and 9. However, member 12 and 14 may be oriented in other transverse positions, such as those shown in FIGS. 6 and 7, if desired. Preliminary test results have shown that, with members 12 and 14 mutually perpendicular as shown in FIG. 8, the shear strength parameter of product 10 in its W direction is approximately equal to its shear strength parameter in the L direction. Thus, product 10 is substantially isotropic with respect to this strength property in these two directions. The presence of member 12 in member 14 also increases the compressive and tensile strength of the latter since a compressive or tensile load applied to one or both faces of product 10 is borne by both members 12 and 14.

Since ribbons 22 of member 14 are partially severed during the embedding operation, the shear strength of member 14 in the L direction thereof is slightly reduced. However, this disadvantage is offset by applying a bonding agent to product 10 such as by dipping the same into a liquid mass of synthetic resin material capable of curing to a hardened condition. Such an agent will fill the slots in the ribbons and, when hardened, will become part of product 10.

Figures 4, 5:
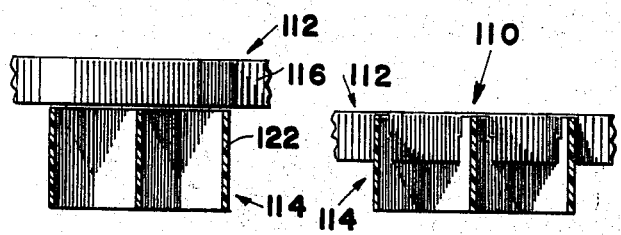
FIGS. 4 and 5 are fragmentary views which illustrate the method of the invention using a pair of honeycomb members of different thicknesses.

Another form of the product of this invention is shown in FIG. 5 and is denoted by the numeral 110. Product 110 is formed by embedding a first honeycomb member 112 in a second honeycomb member 114 with the ribbons 116 of member 112 disposed transversely of ribbons 22 of member 114. The thickness of member 12, i.e., the width of each ribbon 116 thereof is less than the thickness of member 114. Member 114 will therefore be strengthened only at the face adjacent which member 112 is disposed. This construction allows for the localized increase of the structural strength properties of member 114 and, if a number of spaced members 112 are embedded in member 114, the resulting product 110 will have increased strength at spaced localized areas while the remaining areas will be substantially unaffected.

FIG. 4 illustrates the relative dispositions of members 112 and 114 before the embedding operation. Here again, co-operating slots similar to slots 28 and 32 are formed in ribbons 116 and 122 as member 112 is forced into member 114. Generally, as soon as member 112 is disposed so that no portion thereof projects outwardly from member 114, the embedding operation is complete. The bonding agent may then be applied to product 110 to fill the slots in the ribbons.

FIGS. 7 and 8 illustrate that one of the members may be of a different cell size than the other member if a relatively large increase or decrease in density is desired or required. In FIG. 7 a honeycomb product 210 is comprised of a pair of relatively angularly disposed members 212 and 214, with member 212 embedded in member 214 to increase the structural strength parameter of the latter. For purposes of illustration, the cell size of member 212 is less than that of member 214. Nonetheless, product 210 is formed by the method of this invention set forth above.

FIG. 8 illustrates a product 310 comprised of a pair of mutually perpendicular honeycomb members 312 and 314, with member 312 embedded in member 314 to provide an increase in the structural strength properties thereof. The cell size of member 312 is less than that of member 314.

The honeycomb product of this invention, in many instances, may be formed using scrap honeycomb segments as the strengthening members, such as strengthening member 12 of product 10. The use of scrap honeycomb can eliminate the need to especially manufacture additional expanded honeycomb members to serve this purpose and thereby result in a reduction of the unit cost of the product.

FIG. 9 illustrates that the principles of the invention can be applied to curved honeycomb members. In this view, a honeycomb product 410 is formed by embedding strengthening honeycomb members 412 at spaced locations in honeycomb member 414 after the latter is forced into the desired arcuate configuration. It has been found that members 412 not only strengthen member 414 but also maintain the latter in the desired configuration.

By arranging the two honeycomb members forming the product in the manner described, new cellular configurations may be devised which may provide an optimum geometry for core properties. As an example of this feature, both compressive and tensile strengths of the product are significantly increased over that of the member to be strengthened. Also, the stiffness of the product in a direction parallel to the end face thereof is greater than that of the member to be strengthened.

Standard blankets of honeycomb material may be selectively reinforced at localized areas by following the teachings of this invention as exemplified by the product in FIG. 5. Where a core is curved and has "slashed" areas, i.e., partial cutting of the core to facilitate curving, the product may be reinforced by the practice of this method so that its strength characteristics will approximate those of the produce before it is curved. Moreover, contoured cores will maintain their basic shapes after additional segments are forced thereinto after the contouring process.

While one embodiment of this invention has been shown and described, it will be apparent that other adaptations and modifications can be made without departing from the true spirit and scope of the invention.

What is claimed is:

1. A structural panel comprising: a first honeycomb section having a length and a width and formed with a plurality of ribbons, said ribbons being disposed to define the cells of said member and normally establishing optimum strength characteristics of the section in the direction of its ribbons; a second section of honeycomb of substantially the same length and width dimensions of the first section and also formed with a plurality of ribbons defining cells of said section and normally establishing optimum strength characteristics of the section in the direction of its said ribbons; said first and second sections juxtaposed in face-to-face relation and with the ribbons of the first section extending in a direction substantially perpendicular to the ribbons of said second section the ribbons of said two sections being mutually and substantially fully embedded in each other to form a composite honeycomb panel structure having substantially isotropic structural strength properties in its length and width directions.

2. A structural panel as set forth in claim 1 wherein the thicknesses of the sections are substantially equal and the faces of said sections are disposed in common planes.

3. A structural panel as set forth in claim 1, wherein said first section has a thickness greater than that of the second section, one face of the first section being disposed in a common plane with one face of the second section.

4. A structural panel as set forth in claim 1 wherein is included means bonding said sections together.

5. A structural panel as set forth in claim 1 wherein the size of each cell of said second section is less than the size of each cell of said first section.

6. A structural panel as set forth in claim 1, wherein said first section has an arcuate configuration.

References Cited

UNITED STATES PATENTS

| 2,171,358 | 8/1939 | Le Gall | 161—68 |
| 2,860,740 | 11/1958 | Holland et al. | 156—197 XR |
| 2,960,197 | 11/1960 | Langhans | 161—68 XR |
| 3,227,429 | 1/1966 | Renzi | 261—112 |
| 3,402,105 | 9/1968 | Sze | 202—158 |
| 3,256,001 | 6/1966 | Renzi | 261—112 XR |

JOHN T. GOOLKASIAN, Primary Examiner

H. F. EPSTEIN, Assistant Examiner

U.S. Cl. X.R.

52—615, 668; 264—152